United States Patent
Kim (10) Patent No.: US 12,509,106 B2
(45) Date of Patent: Dec. 30, 2025

(54) VEHICLE CONTROL APPARATUS AND METHOD THEREOF

(71) Applicants: Hyundai Motor Company, Seoul (KR); Kia Corporation, Seoul (KR)

(72) Inventor: Hyun Ju Kim, Yongin-Si (KR)

( * ) Notice: Subject to any disclaimer, the term of this patent is extended or adjusted under 35 U.S.C. 154(b) by 105 days.

(21) Appl. No.: 18/644,998

(22) Filed: Apr. 24, 2024

(65) Prior Publication Data

US 2025/0121846 A1 Apr. 17, 2025

(30) Foreign Application Priority Data

Oct. 13, 2023 (KR) .......................... 10-2023-0136879

(51) Int. Cl.
*B60W 50/14* (2020.01)
*G01S 17/88* (2006.01)

(52) U.S. Cl.
CPC ............. *B60W 50/14* (2013.01); *G01S 17/88* (2013.01); *B60W 2420/408* (2024.01); *B60W 2556/20* (2020.02)

(58) Field of Classification Search
None
See application file for complete search history.

*Primary Examiner* — Thomas S McCormack
(74) *Attorney, Agent, or Firm* — Banner & Witcoff, Ltd.

(57) ABSTRACT

A vehicle control apparatus and a method thereof are provided. The vehicle control apparatus includes a sensor (e.g., light detection and ranging (LiDAR)), a communication circuit, and a processor. The processor receives a signal indicating that a vehicle has entered a specified space that is identified via a sensor, divides the specified space into a lower space and an upper space based on a vertical axis, generates a lower box corresponding to a first external object in the lower space, generates an upper box corresponding to a second external object in the upper space, determines whether the upper box at least partially overlaps with the lower box, and outputs a signal indicating that the second external object and the first external object are a same object.

20 Claims, 8 Drawing Sheets

VEHICLE CONTROL APPARATUS AND METHOD THEREOF

CROSS-REFERENCE TO RELATED APPLICATION

This application claims the benefit of priority to Korean Patent Application No. 10-2023-0136879, filed in the Korean Intellectual Property Office on Oct. 13, 2023, the entire contents of which are incorporated herein by reference.

TECHNICAL FIELD

The present disclosure relates to a vehicle control apparatus and a method thereof, and more particularly, relates to identification of an external object using light detection and ranging (LiDAR).

BACKGROUND

Various studies for identifying an external object using various sensors have been in progress to assist with driving of a vehicle.

Particularly, while the vehicle is operating in a driving aid mode or an autonomous driving mode activated, an external object may be identified using a sensor (e.g., a LiDAR).

When the external object is incorrectly identified using the LiDAR in a tunnel, for example, an upper portion of the tunnel or a large vehicle being identified as a stopped (e.g., stationary) obstacle, this may cause an error in a vehicle control system. When the external object is identified as the stopped obstacle, this may cause a problem in which a driving path of the vehicle is rapidly changed although the external object is not an obstacle to be avoided.

SUMMARY

The present disclosure has been made to solve the above-mentioned problems occurring in some implementations while advantages achieved by those implementations are maintained intact.

An aspect of the present disclosure provides a vehicle control apparatus for preventing an external object from being incorrectly identified in a specified space and a method thereof.

Another aspect of the present disclosure provides a vehicle control apparatus for preventing a large vehicle or an inner wall surface identified in a tunnel from being recognized as a stopped obstacle (e.g., a stationary object) and a method thereof.

Another aspect of the present disclosure provides a vehicle control apparatus for dividing an upper box and a lower box in a tunnel, determining the validity of the upper box, and preventing the misdetection of a moving object and a method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, a vehicle control apparatus may include: a sensor; a communication circuit; and a processor. The processor may be configured to: receive, via the communication circuit, a signal indicating that a vehicle has entered a specified space that is identified via the sensor; and, after receiving the signal, divide, based on a vertical axis, the specified space into a lower space and an upper space. At least a portion of the upper space may overlap with the lower space. The processor may be further configured to generate a lower box corresponding to a first external object identified, via the sensor, in the lower space; generate an upper box corresponding to a second external object identified, via the sensor, in the upper space; determine whether the upper box at least partially overlap with the lower box; and output, based on the upper box at least partially overlaps with the lower box, a signal indicating that the second external object corresponding to the upper box and the first external object are a same object.

The processor may be further configured to: selectively output at least one of the upper box or the lower box, based on the upper box being determined to at least partially overlaps with the lower box.

The processor may be further configured to: determine, via the sensor and based on the vehicle entering the specified space, a road boundary included in the specified space.

The processor may be configured to determine whether the upper box at least partially overlaps with the lower box by: determining whether the upper box at least partially overlaps with the lower box further based on at least one of: a size of the upper box, whether the upper box is within the road boundary, or connectivity between the upper box and the lower box.

The processor may be configured to: determine the connectivity between the lower box and the upper box based on a first plurality of points included in the lower box matching a second plurality of points included in the upper box.

The processor may be further configured to: determine that the vehicle has entered the specified space further based on the signal indicating that the vehicle has entered the specified space at least a specified number of times.

The processor may be further configured to: determine that a third external object corresponding to a second upper box is a different object from a fourth external object corresponding to a second lower box based on the second upper box being determined to not overlap with the second lower box.

The processor may be configured to generate the lower box and the upper box based on determining a plurality of points on a plane parallel to the vertical axis and a horizontal axis.

The processor may be further configured to: delete the upper box based on the first external object and the second external object being determined to be the same object.

The processor may be configured to divide the specified space into the lower space and the upper space by: determining the lower space to be between a ground and a first height; and determining the upper space to be between a second height, less than the first height, and a third height greater than the first height.

The processor may be further configured to: allocate a first identifier to a second lower box corresponding to a third external object and allocate a second identifier to a second upper box corresponding to a fourth external object based on the third external object and the fourth external object being determined to be different objects.

According to one or more example embodiments of the present disclosure, a vehicle control method may include: receiving, via a communication circuit, a signal indicating that a vehicle has entered a specified space that is identified via a sensor; and, after receiving the signal, dividing, based on a vertical axis, the specified space into a lower space and an upper space. At least a portion of the upper space may overlap with the lower space. The method may further include generating a lower box corresponding to a first external object identified, via the sensor, in the lower space; generating an upper box corresponding to a second external object identified, via the sensor, in the upper space; determining whether the upper box at least partially overlaps with the lower box; and outputting, based on the upper box at least partially overlaps with the lower box, a signal indicating that the second external object corresponding to the upper box and the first external object are a same object.

The vehicle control method may further include: selectively outputting at least one of the upper box or the lower box, based on the upper box being determined to at least partially overlaps with the lower box.

The vehicle control method may further include: determining, via the sensor and based on the vehicle entering the specified space, a road boundary included in the specified space.

Determining whether the upper box at least partially overlaps with the lower box may include: determining whether the upper box at least partially overlaps with the lower box further based on at least one of: a size of the upper box,
whether the upper box is within the road boundary, or
connectivity between the upper box and the lower box.

The vehicle control method may include: determining the connectivity between the lower box and the upper box, based on a first plurality of points included in the lower box matching a second plurality of points included in the upper box.

The vehicle control method may further include: determining that the vehicle has entered the specified space further based on the signal indicating that the vehicle has entered the specified space at least a specified number of times.

The vehicle control method may further include: determining that a third the second external object corresponding to a second upper box is a different object from a fourth external object corresponding to a second lower box, based on the second upper box being determined to not overlap with the second lower box.

Generating the lower box and the upper box may include: based on determining a plurality of points on a plane parallel to the vertical axis and a horizontal axis.

The vehicle control method may further include: allocating a first identifier to a second lower box corresponding to a third external object and allocating a second identifier to a second upper box corresponding to a fourth external object based on the third external object and the fourth external object being determined to be different objects.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, one or more example embodiments of the present disclosure will be described in detail with reference to the exemplary drawings. In adding the reference numerals to the components of each drawing, it should be noted that the identical component is designated by the identical numerals even when they are displayed on other drawings. In addition, a detailed description of well-known features or functions will be ruled out in order not to unnecessarily obscure the gist of the present disclosure.

In describing components of example embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, one or more example embodiments of the present disclosure will be described in detail with reference to FIGS. 1 to 8.

Figure 1:
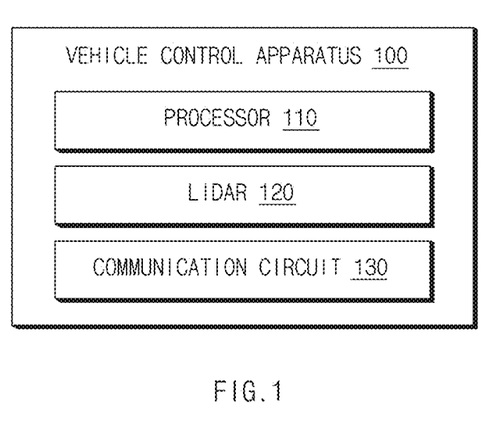
FIG. 1 illustrates an example of a block diagram of a vehicle control apparatus.

FIG. 1 illustrates an example of a block diagram of a vehicle control apparatus.

Referring to FIG. 1, a vehicle control apparatus 100 may be implemented inside or outside a vehicle, and some of components included in the vehicle control apparatus 100 may be implemented inside or outside the vehicle. In this case, the vehicle control apparatus 100 may be integrally configured with control units in the vehicle or may be implemented as a separate device to be connected with the control units of the vehicle by a separate connection means. For example, the vehicle control apparatus 100 may further include components which are not shown in FIG. 1.

Referring to FIG. 1, the vehicle control apparatus 100 may include a processor 110, a sensor (e.g., light detection and ranging (LiDAR) 120), and a communication circuit 130. The processor 110, the LiDAR 120, and the communication circuit 130 may be electronically or operably coupled with each other by an electronical component including a communication bus.

Hereinafter, that pieces of hardware are operably coupled with each other may include that a direct connection or an indirect connection between the pieces of hardware is established in a wired or wireless manner, such that second hardware is controlled by first hardware among the pieces of hardware.

The different blocks are illustrated, but the present disclosure is not limited thereto. For example, some of the pieces of hardware of FIG. 1 may be included in a single integrated circuit including a system on a chip (SoC). Types of the pieces of hardware included in the vehicle control apparatus 100 or the number of the pieces of hardware are limited to those shown in FIG. 1. For example, the vehicle control apparatus 100 may include only some of the pieces of hardware shown in FIG. 1.

The vehicle control apparatus 100 may include hardware for processing data based on one or more instructions. The hardware for processing the data may include the processor 110. For example, the hardware for processing the data may include an arithmetic and logic unit (ALU), a floating point unit (FPU), a field programmable gate array (FPGA), a central processing unit (CPU), and/or an application processor (AP). The processor 110 may have a structure of a single-core processor or may have a structure of a multi-core processor including a dual-core, a quad-core, a hexa-core, or an octa-core.

The LiDAR 120 included in the vehicle control apparatus 100 may obtain datasets for identifying a surrounding thing of the vehicle control apparatus 100. For example, the LiDAR 120 may identify at least one of a position of the surrounding thing, a motion direction of the surrounding thing, or a speed of the surrounding thing, or any combination thereof, based on that a pulse laser signal radiated from the LiDAR 120 is reflected from the surrounding object to return. For example, the datasets obtained by means of the LiDAR 120 may include a three-dimensional (3D) virtual space based on an x-axis (e.g., a longitudinal axis relative to a vehicle), a y-axis (e.g., a lateral axis relative to a vehicle), and a z-axis (e.g., a vertical axis relative to a vehicle).

The communication circuit 130 (also referred to as a communication interface) included in the vehicle control apparatus 100 may include a hardware component for supporting transmission or reception of a signal between the vehicle control apparatus 100 and an external electronic device. For example, the communication circuit 130 may include at least one of a modem, an antenna, or an optic/electronic (O/E) converter, or any combination thereof.

For example, the communication circuit 130 may support transmission or reception of a signal based on various types of protocols including at least one of an Ethernet, a local area network (LAN), a wide area network (WAN), wireless-fidelity (Wi-Fi), Bluetooth, Bluetooth low energy (BLE), ZigBee, long term evolution (LTE), 5th generation new radio (5G NR), a controller area network (CAN), or a local interconnect network (LIN), or any combination thereof.

The processor 110 of the vehicle control apparatus 100 may receive a signal indicating that the vehicle enters a specified space, through the communication circuit 130. For example, the specified space may include a tunnel. For example, the specified space may include at least one of a city tunnel, a tunnel including a steel structure, a tunnel with a large curvature radius, a city underground tunnel, or a highway tunnel, or any combination thereof.

For example, the processor 110 may receive a signal indicating a position of the vehicle from an external electronic device which identifies the position of the vehicle including a global positioning system (GPS). The processor 110 may receive the signal indicating that the vehicle enters the specified space from the external electronic device.

The processor 110 may identify that the vehicle enters the specified space, based on receiving the signal indicating that the vehicle enters the specified space a specified number of times or more. For example, the specified number of times may include about 3 times.

The processor 110 may identify a road boundary included in the specified space, using a plurality of pieces of LiDAR including the LiDAR 120, based on that the vehicle enters the specified space.

For example, the processor 110 may identify the reliability of the road boundary. For example, the processor 110 may identify the reliability of the road boundary using road boundary information stored in a memory (not shown). For example, the processor 110 may receive road boundary information from the communication circuit 130 and may identify the reliability of the road boundary. Contents for identifying the reliability of the road boundary will be described below with reference to FIG. 2.

The processor 110 may divide (e.g., subdivide, categorize, demarcate, etc.) the specified space identified by means of the LiDAR 120 into a lower space and an upper space, on the basis of a third axis among a first axis (e.g., a longitudinal axis), a second axis (e.g., a lateral axis), and the third axis (e.g., a vertical axis), based on that the vehicle enters in the specified space. For example, the processor 110 may divide the specified space identified by means of the LiDAR 120 into the lower space and the upper space, a portion of which overlaps with the lower space.

For example, the first axis may include the x-axis. For example, the second axis may include the y-axis. For example, the third axis may include the z-axis. For example, the first axis, the second axis, and the third axis may include origin points which are perpendicular to each other and cross with each other, respectively. The first axis, the second axis, and the third axis are not limited to the above-mentioned example. Hereinafter, for convenience of description, the first axis is described as the x-axis, the second axis is described as the y-axis, and the third axis is described as the z-axis.

For example, the processor 110 may identify the lower space between the ground and a first height. For example, the processor 110 may identify the upper space between a second height less than the first height and a third height greater than the first height from the ground. The processor 110 may divide the specified space identified by means of the LiDAR 120 into the lower space and the upper space, a portion of which overlaps with the lower space, based on identifying the lower space and the upper space.

For example, the processor 110 may obtain datasets in which a surrounding environment of the vehicle control apparatus 100, which is obtained by means of the LiDAR 120, is represented as a 3D virtual space. The processor 110 may divide the specified space identified by means of the LiDAR 120 into the lower space and the upper space, the portion of which overlaps with the lower space, on the basis of the z-axis among the x-axis, the y-axis, and the z-axis, in the datasets represented as the 3D virtual space.

The processor 110 generate a lower may box corresponding to a first external object identified by means of the LiDAR 120, in the lower space divided on the basis of the z-axis among the x-axis, the y-axis, and the z-axis. For example, the processor 110 may generate the lower box, based on a plurality of points formed by light reflected from the first external object identified in the lower space.

The processor 110 may generate an upper box corresponding to a second external object identified by means of the LiDAR 120, in the upper space, the portion of which overlaps with the lower space on the basis of the z-axis among the x-axis, the y-axis, and the z-axis. For example, the processor 110 may generate the upper box, based on a plurality of points formed by light reflected from the second external object identified in the upper space.

For example, the processor 110 may identify the plurality of points on a plane (e.g., a surface) formed by the y-axis (e.g., a lateral axis) and the z-axis (e.g., a vertical axis) among the x-axis (e.g., a longitudinal axis), the y-axis, and the z-axis. The processor 110 may generate at least one of the lower box or the upper box, or any combination thereof, based on identifying the plurality of points on the plane formed by the y-axis and the z-axis among the x-axis, the y-axis, and the z-axis.

The processor 110 may identify that the lower box and the upper box at least partially overlap with each other. The processor 110 may determine the validity of the upper box, based on that the lower box and the upper box at least partially overlap with each other.

For example, the processor 110 may determine the validity of the upper box, based on at least one of a size of the upper box, whether there is the upper box in the road boundary, or connectivity between the upper box and the lower box, or any combination thereof.

Hereinafter, a description will be given of an example in which the upper box is identified as being valid. If an upper box is identified to be valid, it may signify that the object corresponding to the upper box is associated with the upper space only and not associated with the lower space inside the tunnel. If the upper box is identified as being valid, the object corresponding to the upper box may be a stationary object. If the upper box is identified as being valid, the upper box may be associated with an object that is not associated with the lower box. If an upper box is determined to be invalid, then the upper box may be deleted.

For example, the processor 110 may identify that the upper box is valid, based on that the size of the upper box is identified as being greater than a specified size. For example, the processor 110 may determine that there is the connectivity between the lower box and the upper box, based on that some of a first plurality of points included in the lower box and some of a second plurality of points included in the upper box are the same as each other (e.g., the first plurality of points match the second plurality of points). For example, the processor 110 may identify that the upper box is valid, based on that the upper box is present (or located) in the road boundary.

For example, the processor 110 may identify that the size of the upper box is greater than a specified size, based on that at least one of a width of the upper box or a length of the upper box, or any combination thereof is greater than a reference length.

The processor 110 may identify that the first external object corresponding to the lower box and the second external object corresponding to the upper box are different objects, based on that the upper box is identified as being valid. The processor 110 may allocate a first identifier to the first external object and may allocate a second identifier to the second external object, based on that the first external object and the second external object are identified as the different objects. For example, the identifier may be referred to as a flag.

The processor 110 may generate a track corresponding to the upper box, based on that the upper box is identified as being valid. For example, the track may include one area of the memory. For example, the track may include one area in the memory, which is formed to track an object identified by the LiDAR 120.

Hereinafter, a description will be given of an example in which the upper box is identified as being not valid. For example, the processor 110 may identify that the upper box is not valid, based on that the size of the upper box is identified as being less than or equal to the specified size. For example, the processor 110 may determine that there is no connectivity between the lower box and the upper box, based on that all the first plurality of points included in the lower box and all the second plurality of points included in the upper box are different from each other. For example, the processor 110 may identify that the upper box is not valid, based on that the upper box is present (or located) outside the road boundary.

For example, the processor 110 may identify that the size of the upper box is less than or equal to the specified size, based on that the at least one of the width of the upper box or the length of the upper box, or the any combination thereof is less than or equal to the reference length.

The processor 110 may identify that the first external object corresponding to the lower box and the second external object corresponding to the upper box are the same object (e.g., the first external object matches the second external object), based on that the upper box is identified as being not valid (e.g., invalid). The processor 110 may allocate the same identifier to the first external object and the second external object, based on that the first external object and the second external object are identified as the same object. The processor 110 may cause outputting a signal indicating that the first external object and the second external object are one and the same.

The processor 110 may selectively output at least one of the upper box or the lower box, or any combination thereof, based on that the upper box is identified as being not valid.

Alternatively, the processor 110 may delete the upper box, based on that the upper box is identified as being not valid. Alternatively, the processor 110 may temporarily stop tracking the upper box, based on that the upper box is identified as being not valid.

For example, the processor 110 may set a driving route of the vehicle including the vehicle control apparatus 100, based on selectively outputting the at least one of the upper box or the lower box, or the any combination thereof, may identify a heading direction of an external object corresponding to the at least one of the upper box or the lower box, or the any combination thereof, or may set a speed or steering of the vehicle including the vehicle control apparatus 100.

Figure 2:
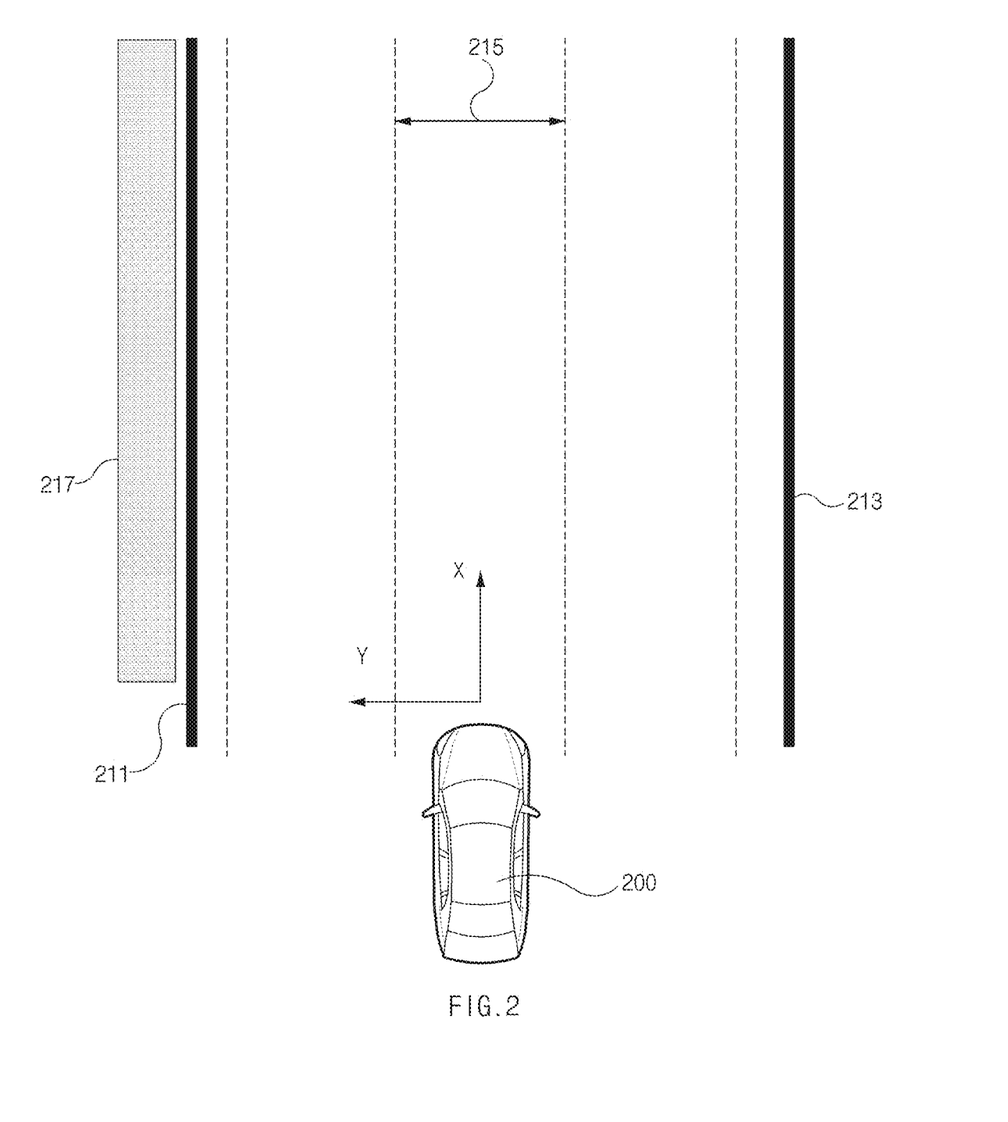
FIG. 2 illustrates an example of identifying a road boundary in a specified space using LiDAR.

FIG. 2 illustrates an example of identifying a road boundary in a specified space using LiDAR.

A vehicle 200 of FIG. 2 may include a vehicle control apparatus 100 of FIG. 1. Operations (or processes) of FIG. 2 may be performed by at least one of the vehicle control apparatus 100 of FIG. 1 or a processor 110 included in the vehicle control apparatus 100 of FIG. 1, or any combination thereof.

Referring to FIG. 2, a processor of a vehicle control apparatus may identify that the vehicle 200 enters a specified space. For example, the processor may receive a signal indicating that the vehicle 200 enters the specified space, through a communication circuit. The processor may identify that the vehicle 200 enters the specified space, based on receiving the signal indicating that the vehicle 200 enters the specified space a specified number of times or more. For example, the specified space may include at least one of a city tunnel, a tunnel including a steel structure, a tunnel with a large curvature radius, a city underground tunnel, or a highway tunnel, or any combination thereof. For example, the specified number of times may include about 3 times.

The processor may identify road boundaries 211 and 213 included in the specified space, based on that the vehicle 200 enters the specified space. For example, the processor may identify the road boundaries 211 and 213, using a plurality of pieces of LiDAR.

The processor may identify the left road boundary 211 using first LiDAR disposed towards the left in front of the vehicle 200. The processor may identify the right road boundary 213 using second LiDAR disposed towards the right in front of the vehicle 200.

For example, the processor may identify at least one of the left road boundary 211 or the right road boundary 213, or any combination thereof, using a road width 215 of a road on which the vehicle 200 is traveling.

The processor may obtain road boundary information through the communication circuit, based on that the vehicle 200 enters the specified space. For example, the road boundary information may be included in map information based on a GPS. For example, the processor may identify the reliability of the road boundary information. The processor may identify the road boundaries 211 and 213 using a lateral position of the vehicle 200, based on that the reliability of the road boundary information is greater than or equal to a specified level. For example, the specified level may include about level 2.

For example, the processor may reset the road boundary information, based on that the reliability of the road boundary information is less than the specified level, and may set a road boundary based on datasets obtained by LiDAR. For example, the processor may set the road boundary based on the datasets obtained by the LiDAR, based on that the road boundary information is not received.

The processor may calculate a lateral position offset, based on identifying the road boundary information. For example, the lateral position offset may be calculated based on Equation 1 below. Equation 1 below may include an instruction. For example, the processor may calculate the lateral position offset, based on instructions including Equation 1 below.

$$VarOffset = \max(C_{OFFSET}, \frac{Width_{box}}{2})$$ [Equation 1]

In Equation 1 above, VarOffset may be referred to as the lateral position offset. $C_{OFFSET}$ C_OFFSET may be set to about i. i may be set by a user or a vendor.

$$\frac{Width_{box}}{2}$$

may include half the width of a virtual box 217. For example, the virtual box 217 may include a virtual box indicating an upper portion of the specified space. However, the present disclosure is not limited thereto.

The processor may identify the reliability of at least one of the left road boundary 211 or the right road boundary 213, or any combination thereof, based on calculating the lateral position offset.

For example, the processor may identify that the reliability of the left road boundary 211 is greater than a threshold. For example, the processor may identify that the reliability of the right road boundary 213 is greater than the threshold. For example, the threshold may include about 1.

The processor may obtain a first value corresponding to the left road boundary 211, based on that the reliability of the left road boundary 211 is greater than the threshold. The processor may obtain a second value corresponding to the right road boundary 213, based on that the reliability of the right road boundary 213 is greater than the threshold. For example, the processor may obtain at least one of the first value corresponding to the left road boundary 211 or the second value corresponding to the right road boundary or any combination thereof, using instructions included in Table 1 below.

TABLE 1

| |
|---|
| RightEnd = −k1 |
| RightEnd = min(RightEnd, RoadInfo.RightLateralPos + VarOffset) |
| LeftEnd = +k1 |
| LeftEnd = max(LeftEnd, RoadInfo.LeftLateralPos − VarOffset) |

Referring to Table 1 above, the processor may set the second value corresponding to the right road boundary 213 to −k1. The processor may obtain the second value corresponding to the right road boundary 213, based on identifying a relatively smaller value between a value obtained by adding position information of the right road boundary 213, which is included in the road boundary information, and the lateral position offset and −k1 corresponding to the right road boundary 213.

The processor may set the first value corresponding to the left road boundary 211 to +k1. The processor may obtain the first value corresponding to the left road boundary 211, based on identifying a relatively smaller value between a value obtained by adding position information of the left road boundary 211, which is included in the road boundary information, and the lateral position offset and +k1 corresponding to the left road boundary 211.

The processor may identify the above-mentioned road boundary and may determine the validity of the upper box. The processor may delete the upper box or may determine that the upper box is a different object from the lower box, based on determining the validity of the upper box.

Hereinafter, a description will be given of an example of dividing the lower space and the upper space.

Figure 3:
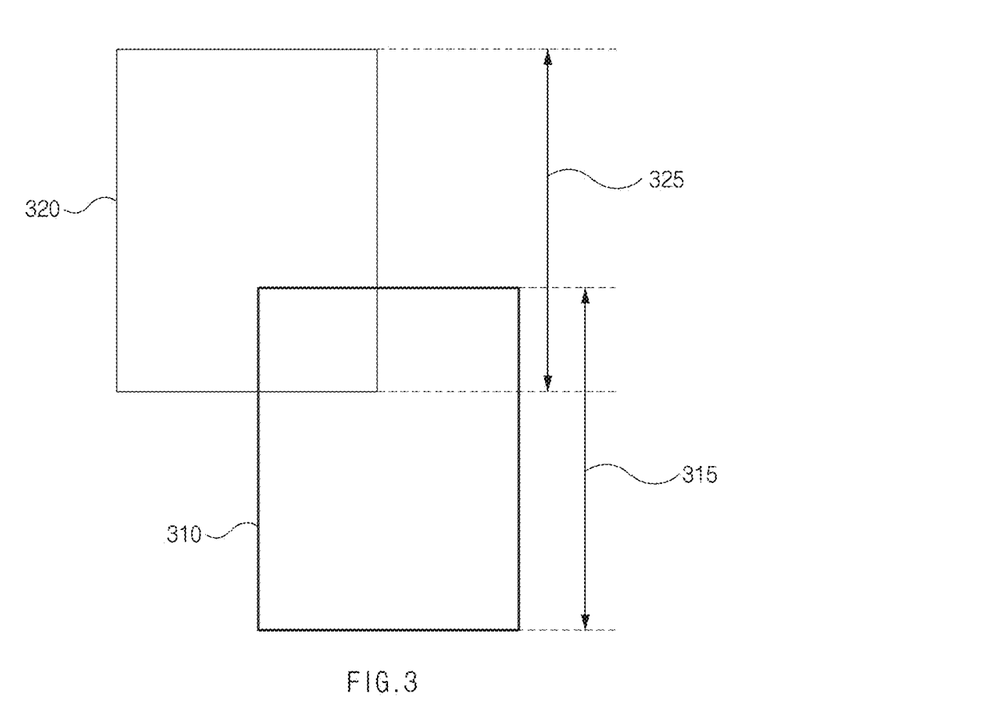
FIG. 3 illustrates an example of dividing a lower space and an upper space using LiDAR.

FIG. 3 illustrates an example of dividing a lower space and an upper space using LiDAR.

Operations (or processes) of FIG. 3 may be performed by at least one of a vehicle control apparatus 100 of FIG. 1 or a processor 110 included in the vehicle control apparatus 100 of FIG. 1, or any combination thereof.

Referring to FIG. 3, a processor included in a vehicle control apparatus may divide a specified space identified by means of LiDAR into a lower space 315 and an upper space 325, a portion of which overlaps with the lower space 315, on the basis of a z-axis among an x-axis, a y-axis, and the z-axis, based on that a vehicle enters the specified space. For example, the processor may identify the specified space, in datasets obtained by the LiDAR, and may divide the identified specified space into the lower space 315 and the upper space 325, the portion of which overlaps with the lower space 315.

For example, the processor may identify the lower space 315 between the ground and a first height. For example, the processor may identify the upper space 325 between a second height less than the first height and a third height greater than the first height from the ground. For example, the first height may include about 1.5 meters (m). For example, the second height may include about 1 m. For example, the third height may include about 3 m. The lower space 315 and the upper space 325 may partially overlap with each other in an area between about 1 m and about 1.5 m.

For example, the processor may generate virtual boxes corresponding to external objects in the lower space 315 and the upper space 325, based on receiving a signal indicating the vehicle enters the specified space. For example, the processor may generate at least one of the lower box 310 or the upper box 320, or any combination thereof, based on identifying a plurality of points on a plane formed by the y-axis and the z-axis among the x-axis, the y-axis, and the z-axis. For example, the plurality of points may be included in datasets obtained by the LiDAR.

The processor may allocate an identifier different from the lower box 310 to the upper box 320 identified in the upper space 325. For example, the processor may allocate an identifier including "Flag=1" to the upper box 320. For example, that "Flag=1" may include an identifier indicating the external object identified in the upper space 325 of the specified space.

Hereinafter, a description will be given of an example of identifying an upper box and a lower box and identifying the validity of the upper box.

Figure 4:
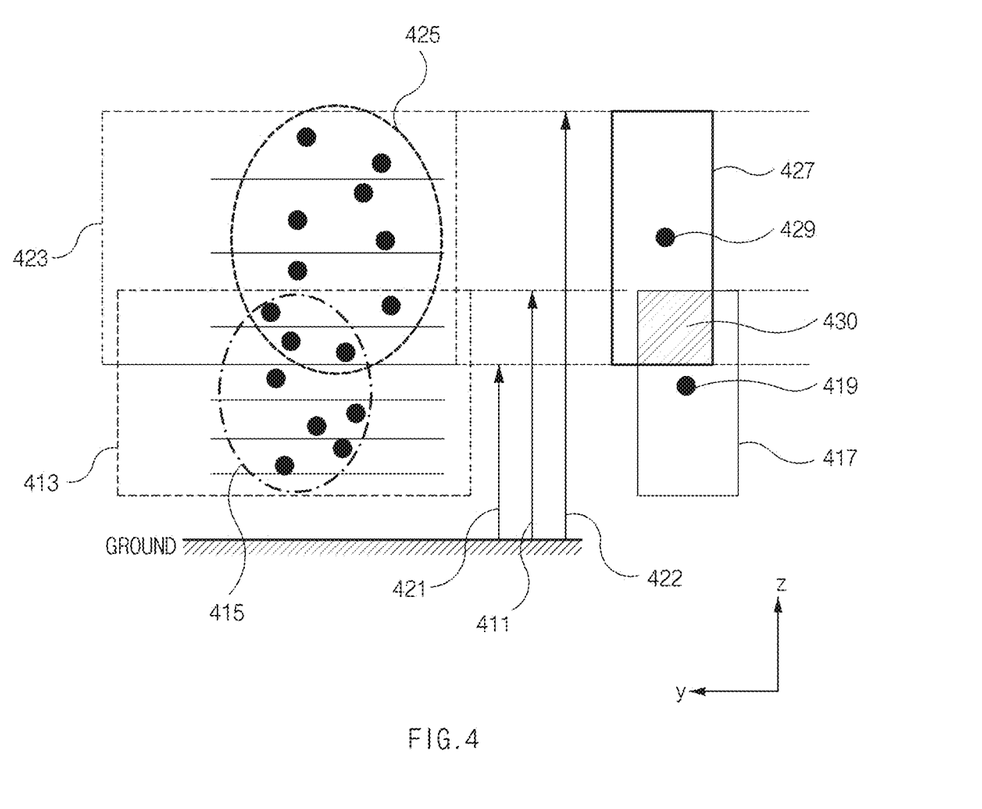
FIG. 4 illustrates an example of determining the validity of an upper box.

FIG. 4 illustrates an example of determining the validity of an upper box.

Operations (or processes) of FIG. 4 may be performed by at least one of a vehicle control apparatus 100 of FIG. 1 or a processor 110 included in the vehicle control apparatus 100 of FIG. 1, or any combination thereof.

Referring to FIG. 4, a processor of a vehicle control apparatus may obtain a plurality of points 415 and 425 by means of LiDAR. The processor may generate virtual boxes corresponding to external objects, based on the plurality of obtained points 415 and 425.

The processor may divide a specified space, on the basis of a z-axis among an x-axis, a y-axis, and the z-axis, based on receiving a signal indicating that a vehicle enters the specified space. For example, the processor may divide the specified space into a lower space 413 and an upper space 423, a portion of which overlaps with the lower space 413.

For example, the processor may identify the lower space 413 between the ground and a first height 411. For example, the processor may identify the upper space 423 between a second height 421 less than the first height 411 and a third height 422 greater than the first height 411 from the ground.

The processor may generate a lower box 417, based on the first plurality of points 415 identified in the lower space 413. The processor may generate an upper box 427, based on the second plurality of points 425 identified in the upper space 423.

The processor may determine the validity of the upper box 427 generated based on the second plurality of points 425. For example, the processor may determine the validity of the upper box 427, based on at least one of a size of the upper box 427, whether there is the upper box 427 in a road boundary, or connectivity 427 between the upper box 427 and the lower box 417, or any combination thereof. When the upper box 427 is valid, the processor may output the upper box 427. When the upper box 427 is not valid, the processor may delete the upper box 427 or may temporarily stop outputting the upper box 427.

Hereinafter, a description will be given of an example of determining the connectivity between the upper box 427 and the lower box 417.

The processor may identify a center point 419 of the lower box 417. The processor may identify a center point 429 of the upper box 427. The processor may identify a distance between the center point 419 of the lower box 417 and the center point 429 of the upper box 427. For example, the processor may identify a Mahalanobis distance between the center point 419 of the lower box 417 and the center point 429 of the upper box 427.

For example, the processor may identify the Mahalanobis distance based on first coordinates of the center point 419 of the lower box 417 and second coordinates of the center point 429 of the upper box 427. For example, the first coordinates of the center point 419 of the lower box 417 may be referred to as (X1, Y1). For example, the second coordinates of the center point 429 of the upper box 427 may be referred to as (X2, Y2). For example, the processor may identify the connectivity between the upper box 427 and the lower box 417, using Equation 2 below.

$$\frac{(X1-X2)^2}{(\sigma_{X1}^2+\sigma_{X2}^2)}+\frac{(Y1-Y2)^2}{(\sigma_{Y1}^2+\sigma_{Y2}^2)}<C \qquad [\text{Equation 2}]$$

Referring to Equation 2 above, X1 may include X1 included in the first coordinates of the center point 419 of the lower box 417. For example, X1 included in the first coordinates may include a y-coordinate of the center point 419. X2 may include X2 included in the second coordinates of the center point 429 of the upper box 427. For example, X2 included in the second coordinates may include a y-coordinate of the center point 429.

Y1 may include Y1 included in the first coordinates of the center point 419 of the lower box 417. For example, Y1 included in the first coordinates may include a z-coordinate of the center point 419. Y2 may include Y2 included in the second coordinates of the center point 429 of the upper box 427. For example, Y2 included in the second coordinates may include a z-coordinate of the center point 429. For example, C may be set to 0.5 m. For example, σ may set to j m. j may be set by a user or a vendor. However, the present disclosure is not limited thereto.

The processor may determine connectivity between the upper box 427 and the lower box 417, based on the Mahalanobis distance between the center point 419 included in the lower box 417 and the center point 429 included in the upper box 427.

For example, based on that the Mahalanobis distance between the center point 419 included in the lower box 417 and the center point 429 included in the upper box 427 is identified as being less than a threshold (e.g., about 0.5 m), the processor may determine that there is the connectivity between the upper box 427 and the lower box 417. For example, based on that the Mahalanobis distance between the center point 419 included in the lower box 417 and the center point 429 included in the upper box 427 is identified as being greater than or equal to the threshold, the processor may determine that there is no connectivity between the upper box 427 and the lower box 417.

The processor may identify connectivity between the lower box 417 and the upper box 427, based on that the lower box 417 and the upper box 427 overlap with each other.

For example, the processor may determine that there is the connectivity between the lower box 417 and the upper box 427, based on identifying an area 430 in which the lower box 417 and the upper box 427 overlap with each other. For example, the processor may determine that there is the connectivity between the lower box 417 and the upper box 427, based on that some of the first plurality of points 415 included in the lower box 417 and some of the second plurality of points 425 included in the upper box 427 are the same as each other (e.g., the first plurality of points match the second plurality of points).

The processor may selectively output at least one of the lower box 417 or the upper box 427, or any combination thereof, based on determining that there is the connectivity between the lower box 417 and the upper box 427.

For example, the processor may determine that there is no connectivity between the lower box 417 and the upper box 427, based on not identifying the area 430 in which the lower box 417 and the upper box 427 overlap with each other. For example, the processor may determine that there is no connectivity between the lower box 417 and the upper box 427, based on that all the first plurality of points 415 included in the lower box 417 and all the second plurality of points 425 included in the upper box 427 are not the same as each other.

The processor may allocate an identifier to each of the lower box 417 and the upper box 427, based on determining that there is no connectivity between the lower box 417 and the upper box 427. For example, the processor may allocate a first identifier to the lower box 417 and may allocate a second identifier to the upper box 427, based on determining that there is no connectivity between the lower box 417 and the upper box 427.

Figure 5:
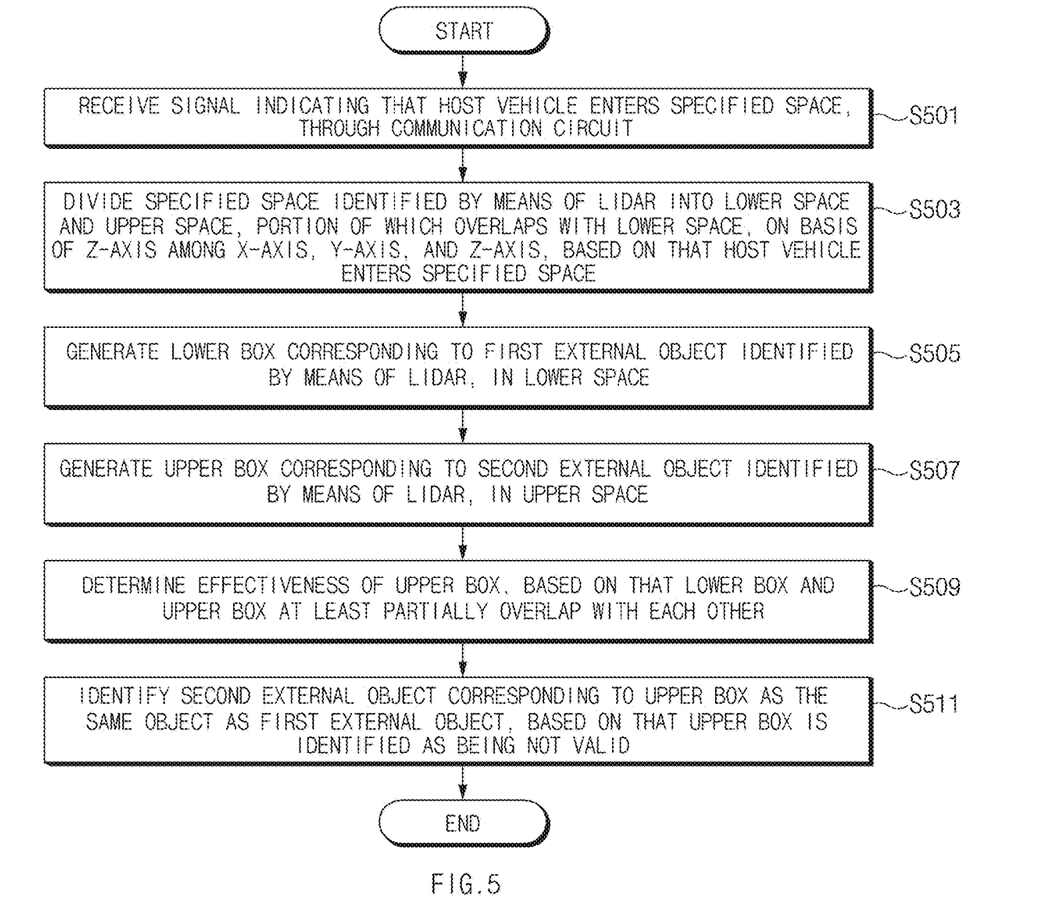
FIG. 5 illustrates an example of a flowchart of a vehicle control method.

FIG. 5 illustrates an example of a flowchart of a vehicle control method.

Hereinafter, it is assumed that a vehicle control apparatus 100 of FIG. 1 performs a process of FIG. 5. Furthermore, in a description of FIG. 5, an operation described as being performed by a processor may be understood as being controlled by a processor 110 of the vehicle control apparatus 100.

At least one of the operations of FIG. 5 may be performed by the vehicle control apparatus 100 of FIG. 1. The respective operations of FIG. 5 may be sequentially performed, but are not necessarily sequentially performed. For example, an order of the respective operations may be changed, and at least two operations may be performed in parallel.

Referring to FIG. 5, in S501, the vehicle control method may include receiving a signal indicating that a vehicle enters a specified space, through a communication circuit. For example, the vehicle control method may include identifying a road boundary included in the specified space, using a plurality of pieces of LiDAR including LiDAR.

In S503, the vehicle control method may include dividing the specified space identified by means of the LiDAR into a lower space and an upper space, a portion of which overlaps with the lower space, on the basis of a z-axis among an x-axis, a y-axis, and the z-axis, based on that the vehicle enters the specified space.

For example, the vehicle control method may include identifying an external object in each of the lower space and the upper space.

In S505, the vehicle control method may include generating a lower box corresponding to a first external object identified by means of the LiDAR, in the lower space.

In S507, the vehicle control method may include generating an upper box corresponding to a second external object identified by means of the LiDAR, in the upper space.

In S509, the vehicle control method may include determining the validity of the upper box, based on that the lower box and the upper box at least partially overlap with each other.

For example, the vehicle control the method may include determining the validity of the upper box, based on at least one of a size of the upper box, whether there is the upper box in a road boundary, or connectivity between the upper box and the lower box, or any combination thereof.

In S511, the vehicle control method may include identifying a second external object corresponding to the upper box as the same object as the first external object, based on that the upper box is identified as being not valid.

The vehicle control method may include selectively outputting at least one of the upper box or the lower box, or any combination thereof, based on that the upper box is identified as being not valid.

The vehicle control method may include identifying the second external object corresponding to the upper box as a different object from the first external object, based on that the upper box is identified as being valid. The vehicle control the method may include allocating a first identifier to the lower box corresponding to the first external object and allocating a second identifier to the upper box corresponding to the second external object, based on that the first external object and the second external object are identified as different objects.

Figure 6:
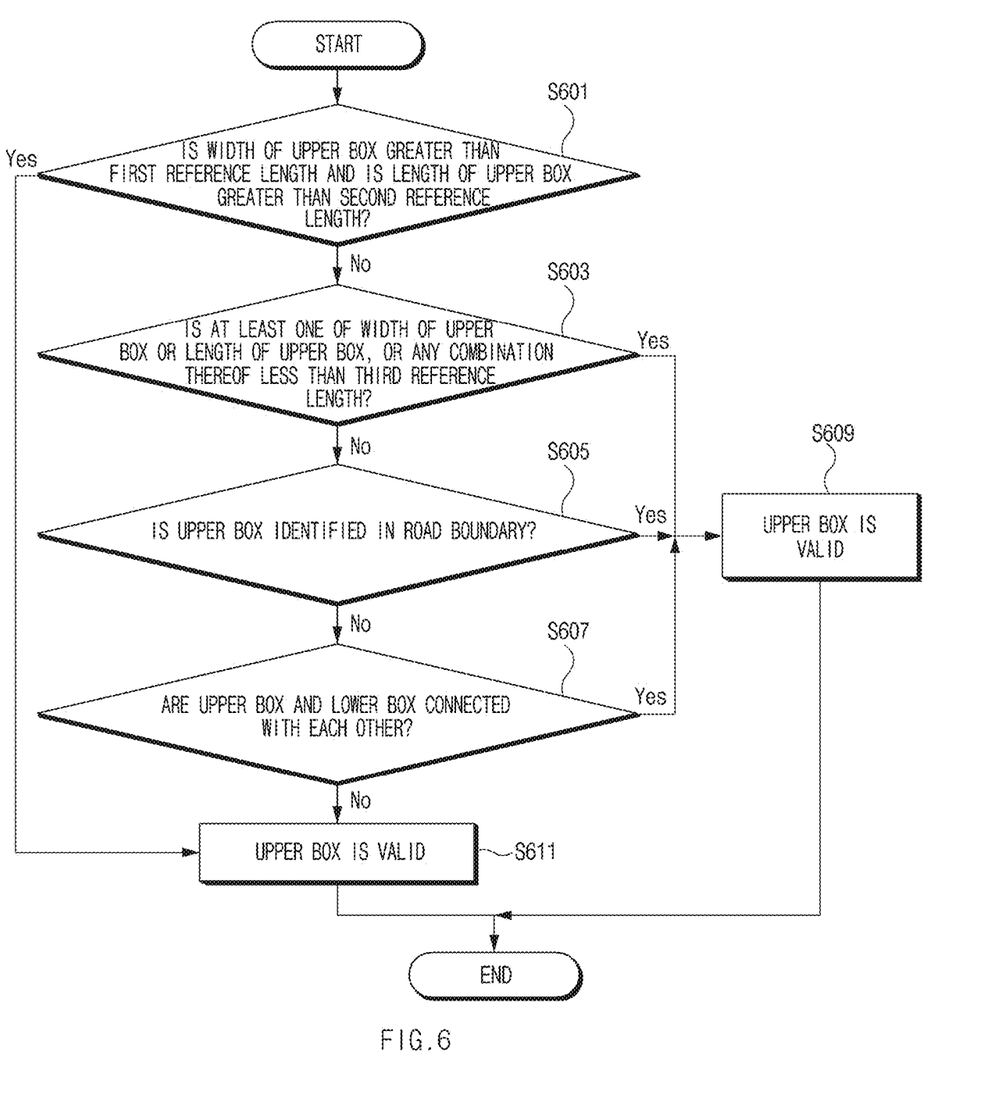
FIG. 6 illustrates an example of a flowchart of a vehicle control method.

FIG. 6 illustrates an example of a flowchart of a vehicle control method.

Hereinafter, it is assumed that a vehicle control apparatus 100 of FIG. 1 performs a process of FIG. 6.

Furthermore, in a description of FIG. 6, an operation described as being performed by a processor may be understood as being controlled by a processor 110 of the vehicle control apparatus 100.

At least one of the operations of FIG. 6 may be performed by the vehicle control apparatus 100 of FIG. 1. The respective operations of FIG. 6 may be sequentially performed, but are not necessarily sequentially performed. For example, an order of the respective operations may be changed, and at least two operations may be performed in parallel.

Referring to FIG. 6, in S601, the vehicle control method may include identifying whether a width of an upper box is greater than a first reference length and whether a length of the upper box is greater than a second reference length.

For example, the width of the upper box may include a relatively short segment among segments forming the upper box. The length of the upper box may include a relatively long segment among the segments forming the upper box.

For example, the first reference length may include about 3 m. For example, the second reference length may include about 20 m.

When the width of the upper box is not greater than the first reference length and the length of the upper box is not greater than the second reference length (No of S601), in S603, the vehicle control method may include identifying whether at least one of the width of the upper box or the length of the upper box, or any combination thereof is less than a third reference length. For example, the third reference length may include about 5 m.

When the width of the upper box is greater than the first reference length and the length of the upper box is greater than the second reference length (Yes of S601), in S611, the vehicle control method may include identifying that the upper box is valid.

When the at least one of the width of the upper box or the length of the upper box, or the any combination thereof is not less than the third reference length (No of S603), in S605, the vehicle control method may include determining whether the upper box is identified in a road boundary.

When the upper box is not identified in the road boundary (No of S605), in S607, the vehicle control method may include identifying whether the upper box and a lower box are connected with each other.

When the upper box and the lower box are not connected with each other (No of S607), in S611, the vehicle control method may include identifying that the upper box is valid.

The vehicle control method may include respectively allocating identifiers to the upper box and the lower box, based on that the upper box is identified as being valid. The vehicle control method may include outputting the upper box and the lower box, based on that the upper box is identified as being valid.

When the at least one of the width of the upper box or the length of the upper box, or the any combination thereof is less than the third reference length (Yes of S603), in S609, the vehicle control method may include identifying that the upper box is not valid.

When the upper box is identified in the road boundary (Yes of S605), in S609, the vehicle control method may include identifying that the upper box is not valid.

When the upper box and the lower box are connected with each other (Yes of S607), in S609, the vehicle control method may include identifying that the upper box is not valid.

The vehicle control method may include determining a second external object corresponding to the upper box as the same object as a first external object corresponding to the lower box, based on that the upper box is identified as being not valid.

The vehicle control method may include selectively outputting at least one of the upper box or the lower box, or any combination thereof, based on that the upper box is identified as being not valid.

Figure 7:
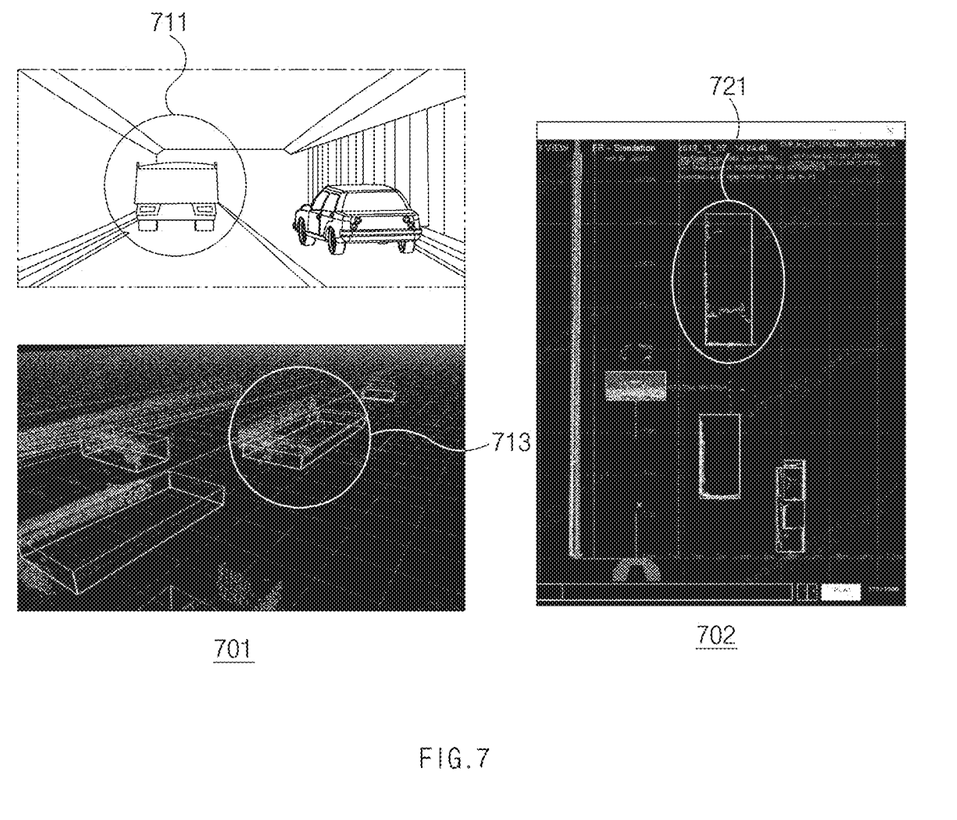
FIG. 7 illustrates an example of a result of determining the validity of an upper box in a vehicle control apparatus.

FIG. 7 illustrates an example of a result of determining the validity of an upper box in a vehicle control apparatus.

Referring to FIG. 7, a first example 701 may include an example to which the present technology is not applied. Referring to the first example 701, a processor included in a vehicle control apparatus may identify a commercial vehicle including a truck 711 using LiDAR.

The processor may generate virtual boxes 713 corresponding to the truck 711, based on identifying the commercial vehicle including the truck 711 using the LiDAR. For example, the virtual boxes 713 may include an upper box and a lower box. For example, as a single external object is incorrectly identified, the virtual boxes 713 may include boxes expressed in plural.

The processor to which the present technology is applied may be referred to as a second example 702. For example, the second example 702 may include an example of deleting an upper box and outputting a lower box, as the upper box is identified as being not valid.

For example, the processor may delete the upper box and may output a lower box 721, based on that the upper box is identified as being not valid.

Figure 8:
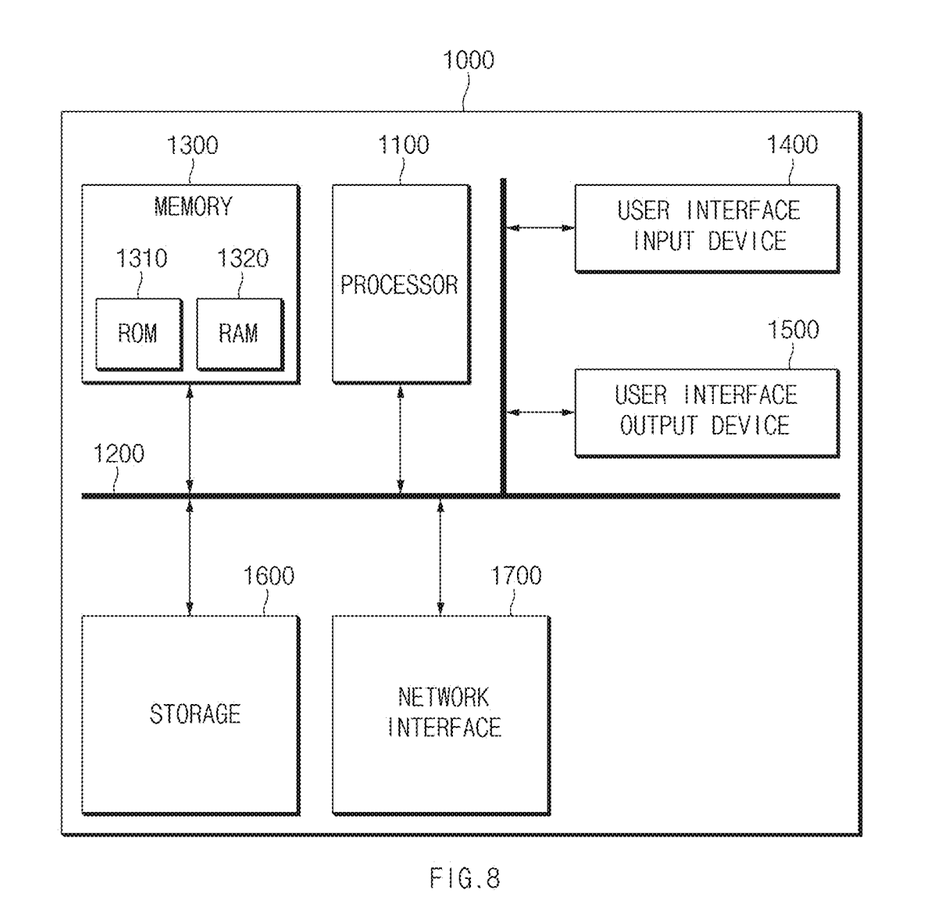
FIG. 8 illustrates a computing system including a vehicle control apparatus.

FIG. 8 illustrates a computing system including a vehicle control apparatus.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

The present technology may prevent an external object from being incorrectly identified in a specified space.

Furthermore, the present technology may prevent a large vehicle or an inner wall plane identified in a tunnel from being recognized as a stopped obstacle (e.g., a stationary object).

Furthermore, the present technology may divide an upper box and a lower box in a tunnel, may determine the validity of the upper box, and may prevent the misdetection of a moving object.

In addition, various effects ascertained directly or indirectly through the present disclosure may be provided.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the example embodiments of the present disclosure are provided to explain the spirit and scope of the present disclosure, but not to limit them, so that the spirit and scope of the present disclosure is not limited by the one or more example embodiments described herein. The scope of the present disclosure should be construed on the basis of the accompanying claims, and all the technical ideas within the scope equivalent to the claims should be included in the scope of the present disclosure.

What is claimed is:

1. A vehicle control apparatus comprising:
   a sensor;
   a communication circuit; and
   a processor configured to:
   receive, via the communication circuit, a signal indicating that a vehicle has entered a specified space that is identified via the sensor;
   after receiving the signal, divide, based on a vertical axis, the specified space into a lower space and an upper space, wherein at least a portion of the upper space overlaps with the lower space;
   generate a lower box corresponding to a first external object identified, via the sensor, in the lower space;
   generate an upper box corresponding to a second external object identified, via the sensor, in the upper space;
   determine whether the upper box at least partially overlap with the lower box; and output, based on the upper box at least partially overlaps with the lower box, a signal indicating that the second external object corresponding to the upper box and the first external object are a same object.

2. The vehicle control apparatus of claim 1, wherein the processor is further configured to:
selectively output at least one of the upper box or the lower box, based on the upper box being determined to at least partially overlaps with the lower box.

3. The vehicle control apparatus of claim 1, wherein the processor is further configured to:
determine, via the sensor and based on the vehicle entering the specified space, a road boundary included in the specified space.

4. The vehicle control apparatus of claim 3, wherein the processor is configured to determine whether the upper box at least partially overlaps with the lower box by:
determining whether the upper box at least partially overlaps with the lower box further based on at least one of:
a size of the upper box,
whether the upper box is within the road boundary, or
connectivity between the upper box and the lower box.

5. The vehicle control apparatus of claim 4, wherein the processor is configured to:
determine the connectivity between the lower box and the upper box based on a first plurality of points included in the lower box matching a second plurality of points included in the upper box.

6. The vehicle control apparatus of claim 1, wherein the processor is further configured to:
determine that the vehicle has entered the specified space further based on the signal indicating that the vehicle has entered the specified space at least a specified number of times.

7. The vehicle control apparatus of claim 1, wherein the processor is further configured to:
determine that a third external object corresponding to a second upper box is a different object from a fourth external object corresponding to a second lower box based on the second upper box being determined to not overlap with the second lower box.

8. The vehicle control apparatus of claim 1, wherein the processor is configured to generate the lower box and the upper box based on determining a plurality of points on a plane parallel to the vertical axis and a horizontal axis.

9. The vehicle control apparatus of claim 1, wherein the processor is further configured to:
delete the upper box based on the first external object and the second external object being determined to be the same object.

10. The vehicle control apparatus of claim 1, wherein the processor is configured to divide the specified space into the lower space and the upper space by:
determining the lower space to be between a ground and a first height; and
determining the upper space to be between a second height, less than the first height, and a third height greater than the first height.

11. The vehicle control apparatus of claim 1, wherein the processor is further configured to:
allocate a first identifier to a second lower box corresponding to a third external object and allocate a second identifier to a second upper box corresponding to a fourth external object based on the third external object and the fourth external object being determined to be different objects.

12. A vehicle control method comprising:
receiving, via a communication circuit, a signal indicating that a vehicle has entered a specified space that is identified via a sensor;
after receiving the signal, dividing, based on a vertical axis, the specified space into a lower space and an upper space, wherein at least a portion of the upper space overlaps with the lower space;
generating a lower box corresponding to a first external object identified, via the sensor, in the lower space;
generating an upper box corresponding to a second external object identified, via the sensor, in the upper space;
determining whether the upper box at least partially overlaps with the lower box; and
outputting, based on the upper box at least partially overlaps with the lower box, a signal indicating that the second external object corresponding to the upper box and the first external object are a same object.

13. The vehicle control method of claim 12, further comprising:
selectively outputting at least one of the upper box or the lower box, based on the upper box being determined to at least partially overlaps with the lower box.

14. The vehicle control method of claim 12, further comprising:
determining, via the sensor and based on the vehicle entering the specified space, a road boundary included in the specified space.

15. The vehicle control method of claim 14, wherein the determining of whether the upper box at least partially overlaps with the lower box comprises:
determining whether the upper box at least partially overlaps with the lower box further based on at least one of:
a size of the upper box,
whether the upper box is within the road boundary, or
connectivity between the upper box and the lower box.

16. The vehicle control method of claim 15, further comprising:
determining the connectivity between the lower box and the upper box, based on a first plurality of points included in the lower box matching a second plurality of points included in the upper box.

17. The vehicle control method of claim 12, further comprising:
determining that the vehicle has entered the specified space further based on the signal indicating that the vehicle has entered the specified space at least a specified number of times.

18. The vehicle control method of claim 12, further comprising:
determining that a third the second external object corresponding to a second upper box is a different object from a fourth external object corresponding to a second lower box, based on the second upper box being determined to not overlap with the second lower box.

19. The vehicle control method of claim 12, wherein the generating of the lower box and the upper box comprises:
based on determining a plurality of points on a plane parallel to the vertical axis and a horizontal axis.

20. The vehicle control method of claim 12, further comprising:

allocating a first identifier to a second lower box corresponding to a third external object and allocating a second identifier to a second upper box corresponding to a fourth external object based on the third external object and the fourth external object being determined to be different objects.

* * * * *